(12) United States Patent
Asakura et al.

(10) Patent No.: US 6,257,038 B1
(45) Date of Patent: Jul. 10, 2001

(54) METHOD OF MANUFACTURING A COLUMNAR MATERIAL

(75) Inventors: Takashi Asakura; Masafumi Takahashi; Junzo Ozawa, all of Aichi (JP)

(73) Assignee: Aoyama Seisakusho Company, Ltd., Aichi (JP)

( * ) Notice: Subject to any disclaimer, the term of this patent is extended or adjusted under 35 U.S.C. 154(b) by 0 days.

(21) Appl. No.: 09/402,420

(22) PCT Filed: Feb. 2, 1999

(86) PCT No.: PCT/JP99/00420

§ 371 Date: Oct. 4, 1999

§ 102(e) Date: Oct. 4, 1999

(87) PCT Pub. No.: WO99/39851

PCT Pub. Date: Aug. 12, 1999

(30) Foreign Application Priority Data

Feb. 4, 1998 (JP) .................................................. 10-023099

(51) Int. Cl.[7] .................................................. B21B 15/00
(52) U.S. Cl. .................................................. 72/206; 72/274
(58) Field of Search .......................... 72/206, 274, 275, 72/276, 278, 370.16, 370.2, 370.21, 378, 343; 29/890.05

(56) References Cited

U.S. PATENT DOCUMENTS 2,110,275 * 3/1938 Rabe .................................. 72/206
2,586,011 * 2/1952 Doelter ............................ 72/365.2

FOREIGN PATENT DOCUMENTS 3-272805    4/1991 (JP) .
5-305383   11/1993 (JP) .

* cited by examiner

*Primary Examiner*—Lowell A. Larson
(74) *Attorney, Agent, or Firm*—David G. Conlin; William J. Daley, Jr.; Dike, Bronstein, Roberts & Cushman, Intellectual Property Practice Group

(57) ABSTRACT

The invention has been accomplished in order to provide a method of manufacturing a columnar material of metal having an excellent dimensional accuracy without the need of much work time and cost, said method comprising equally forming a multiplicity of longitudinal grooves on an outer periphery of a column-shaped raw material of metal, and then uniformly squeezing tip ends of portions between the respective longitudinal grooves to make the same flat to obtain a target outside dimension.

4 Claims, 2 Drawing Sheets

METHOD OF MANUFACTURING A COLUMNAR MATERIAL

TECHNICAL FIELD

The invention relates to a method of manufacturing a columnar material of metal having a precise outside dimension.

BACKGROUND ART

Conventionally, substantially column-shaped parts, for example, a columnar material of metal having a precise outside dimension and used for shaft parts are manufactured by machining an outer periphery of a material by means of a lathe and abrasive finishing the same. With such method, it is possible to obtain a high dimensional accuracy on the order of about 0.01 mm. However, this method offers a problem of the need of much work time and cost in the grinding process, and furthermore a problem in that chip is generated from machining of the material to be prone to produce waste of the material.

A drawing working method with a die has been conventionally known as a method of manufacturing a columnar material of metal. With this method, it is possible to reduce work time and cost as compared with the method by means of machining and grinding. With the drawing working, however, it is difficult to obtain an accuracy on the order of 0.05 mm or less because an excess thickness portion runs off in a longitudinal direction of a material to change a length of a column-shaped body and a spring back phenomenon is caused due to elasticity of a metallic material to generate changes in diameter and length of the material when the metallic material leaves a die as shown in FIG. 2.

DISCLOSURE OF INVENTION

The invention has been accomplished in order to solve the above described problems of the prior art and to provide a method of manufacturing a columnar material of metal, which has a dimensional accuracy on the order of about 0.01 mm, without the need of much work time and cost.

To solve the above described problems, the method of manufacturing a columnar material, according to the invention, comprises equally forming a multiplicity of longitudinal grooves on an outer periphery of a column-shaped raw material of metal, and then uniformly squeezing tip ends of portions between the respective longitudinal grooves to make the same flat to obtain a target outside dimension.

Preferably, the longitudinal grooves are formed by rolling, and squeezing of the tip ends is performed by means of drawing working. This is because such procedure is superior in terms of cost.

It is preferable in terms of work that the longitudinal grooves have a pitch amounting to 9 to 13% of a diameter of the column-shaped raw material, and squeezing be applied to 50% or less of a height of the tip ends. Here, the height of the tip ends corresponds to a height extending from the bottom of the longitudinal grooves to tips of the tip ends.

According to the present method, a spring back phenomenon is avoided by permitting excess thickness portions, which are generated upon application of drawing working, to run off into the longitudinal grooves, whereby tip end portions between the respective longitudinal grooves can be precisely and easily worked to provide a target outside dimension. Therefore, it is possible to obtain a columnar material of metal having a dimensional accuracy on the order of about 0.01 mm without performing machining and grinding as in the prior art.

BRIEF DESCRIPTION OF DRAWINGS

FIGS. 1A, 1C, 1E illustrate a top plan view and FIGS. 1B, 1D, 1F illustrate a front view respectively.

DESCRIPTION OF THE PREFERRED EMBODIMENT

A preferred embodiment of the invention will be illustrated hereinafter.

Figure 1A:
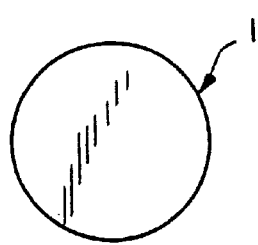
FIGS. 1A–1F are various views illustrating a method of the invention in terms of changes in configuration of a stock material every process, where
Figure 1C:
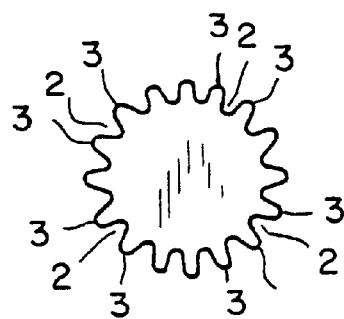
Figure 1E:
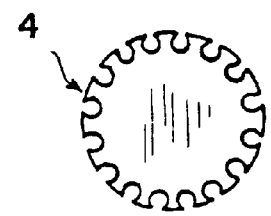
Figure 1B:
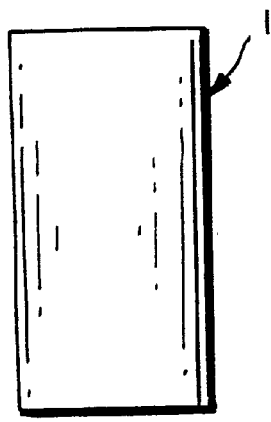
Figure 1D:
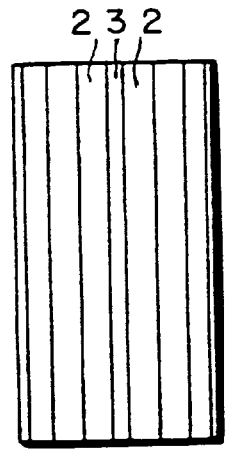

First, a column-shaped raw material of metal is prepared as shown in FIGS. 1A–B, and longitudinal grooves 2 are formed on an outer periphery of the material by means of rolling (see FIGS. 1C–D). In this rolling, rolling dies can be exemplarily used as well as forging dies. Such longitudinal grooves 2 are wave-shaped in cross section as shown in the drawing, and are formed to be in parallel to an axis of the column-shaped raw material 1 or oblique at an angle relative to the axis. Also, the longitudinal grooves 2 are equally formed in a large number on the outer periphery of the column-shaped raw material 1. When an outer diameter of the column-shaped raw material 1 is 7.5 mm, the longitudinal grooves 2 preferably have a depth of about 0.5 mm and a pitch of about 1 mm. Preferably, tip ends of portions (mountain-shaped as shown in the drawing) between adjacent longitudinal grooves 2, 2 have a width of about 0.1 to 0.3 mm. In addition, an optional metal such as iron, stainless steel, copper, aluminum, titanium or the like (of course, alloy of these metals) can be used as the column-shaped raw material 1.

Figure 1F:
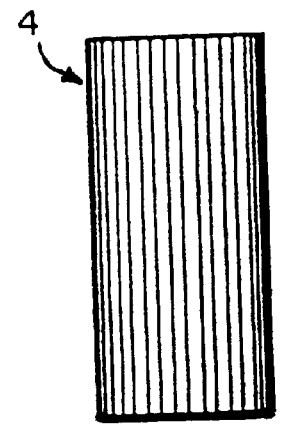
Figure 2:
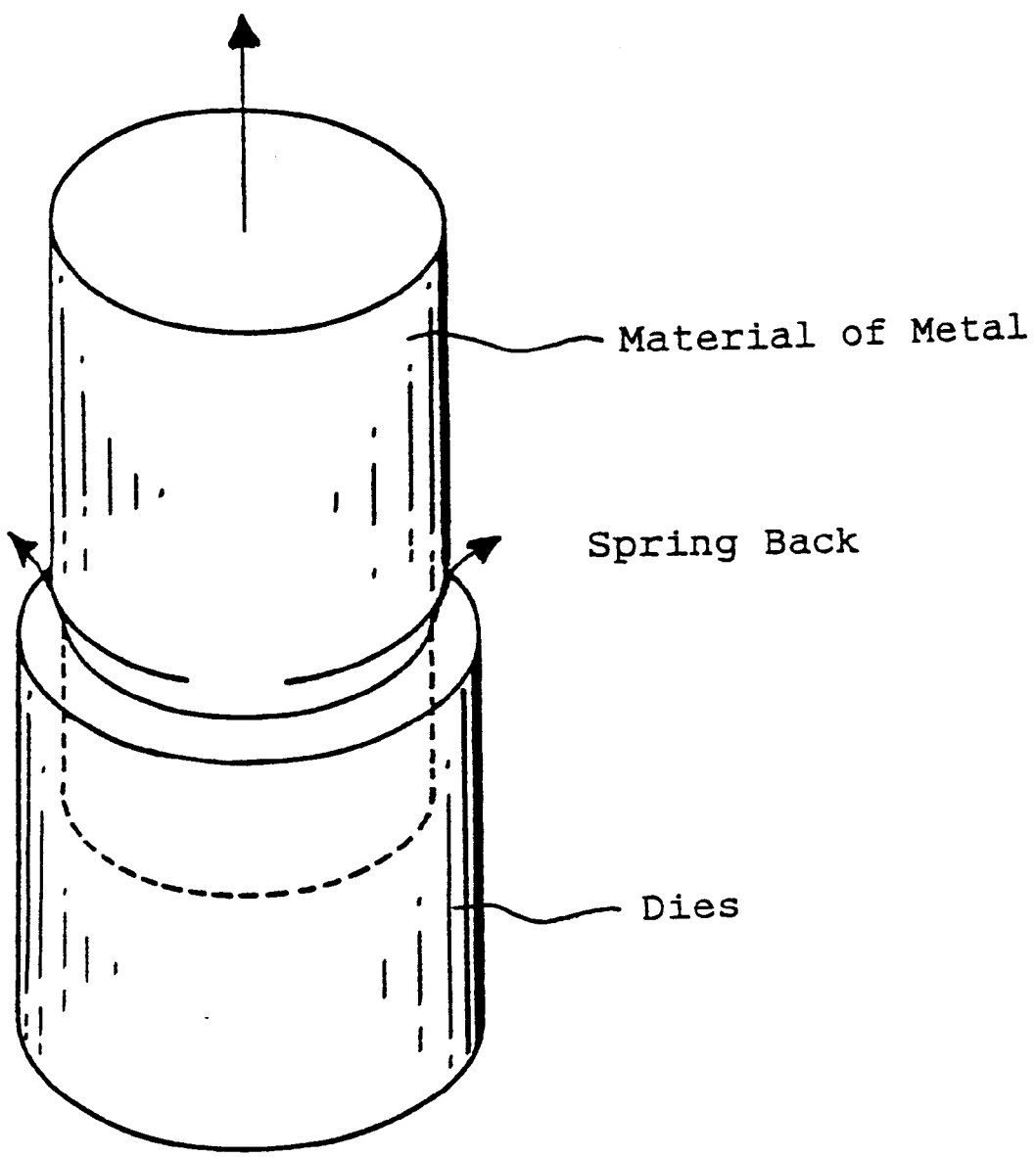
FIG. 2 is a perspective view showing a problem of the prior method (drawing working).

Subsequently, the column-shaped raw material 1 formed with the longitudinal grooves 2 is subjected to drawing by means of a die, and the tip ends 3 between adjacent longitudinal grooves 2, are uniformly squeezed to be made flat as shown in FIGS. 1E–1F to provide a columnar material 4 having target outside dimension. As described in BACKGROUND ART, when the column-shaped raw material 1 is simply subjected to drawing, an excess thickness portion runs off in a longitudinal direction of the material to generate a change in length, and a spring back phenomenon (see FIG. 2) is caused due to elasticity of a metallic material, so that it is impossible to obtain a high dimensional accuracy. According to the invention, however, the multiplicity of longitudinal grooves 2, which are wave-shaped in cross section, are formed equally on the column-shaped raw material 1, and those excess thickness portions, which are generated upon application of drawing working as the subsequent squeezing operation, enter into the longitudinal grooves 2 to cause little movements of the excess thickness portions in the longitudinal direction. In other words, the drawing working is performed in a plane perpendicular to the axis of the column-shaped raw material 1 mainly in two dimensional fashion.

Therefore, the column-shaped raw material 1 is accurately worked to assume a dimension corresponding to an inner diameter of a die for drawing working, and so it is possible to obtain a columnar material 4 of an excellent dimensional accuracy like ones obtained with the conventional method, which uses machining and grinding. The columnar material 4 obtained in this manner can be used for various parts having substantially cylindrical shape, such as shaft parts or the like, for which a high dimensional accuracy is required with respect to surfaces. In addition, in the case of being used for shaft parts, the longitudinal grooves 2 remaining on an outer peripheral surface of the columnar material function as storage spaces for a lubricating oil to be effective in improvement of lubrication.

As described above, with the method of manufacturing a columnar material, according to the invention, it is possible to obtain a columnar material having an excellent dimensional accuracy without the need of much work time and cost as with the conventional method, which uses machining and grinding. Also, the invention avoids waste of material because machining is not employed. In addition, it goes without saying that the method of the invention can be widely applied also to manufacture of various parts, in which other parts are formed at an end or ends of the columnar material.

What is claimed is:

1. A method of manufacturing a columnar material having a precise outside dimension, said method of manufacturing comprising the steps of:

equally forming a multiplicity of longitudinal grooves on an outer periphery of a column-shaped raw material of metal, and then uniformly squeezing only tip ends of portions between adjacent longitudinal grooves to make the same flat to obtain a target outside dimension.

2. The method according to claim 1, wherein said longitudinal grooves are formed by rolling and squeezing of said tip ends is performed by drawing working.

3. The method according to claim 2, wherein said longitudinal grooves have a pitch amounting to 9 to 13% of a diameter of said column-shaped raw material.

4. The method according to claim 3, wherein said squeezing is applied to 50% or less of a height of said tip ends.

* * * * *